United States Patent [19]

Warchol

[11] Patent Number: 4,528,044
[45] Date of Patent: Jul. 9, 1985

[54] AQUEOUS QUENCHANTS CONTAINING POLYOXAZOLINES AND N-VINYL HETEROCYCLIC POLYMERS AND THEIR USE IN QUENCHING STEEL

[75] Inventor: Joseph F. Warchol, West Norriton, Pa.

[73] Assignee: E. F. Houghton & Co., Valley Forge, Pa.

[21] Appl. No.: 660,092

[22] Filed: Oct. 12, 1984

Related U.S. Application Data

[63] Continuation-in-part of Ser. No. 561,980, Dec. 16, 1983, Pat. No. 4,486,246, which is a continuation-in-part of Ser. No. 495,679, May 18, 1983, abandoned.

[51] Int. Cl.$^3$ .............................................. C21D 1/56
[52] U.S. Cl. ..................................... 148/18; 148/20.6; 148/28; 528/402; 524/602
[58] Field of Search .......................... 148/18; 524/606; 548/238; 528/402

[56] References Cited

U.S. PATENT DOCUMENTS

| | | | |
|---|---|---|---|
| 3,220,893 | 11/1965 | Blackwood et al. | 148/28 |
| 3,483,141 | 12/1969 | Litt et al. | 528/402 |
| 3,533,971 | 10/1970 | Austin et al. | 524/602 |
| 3,902,929 | 2/1975 | Meszaros | 148/28 |
| 4,087,290 | 5/1978 | Kopietz et al. | 148/28 |
| 4,381,205 | 4/1983 | Warchol | 148/18 |

OTHER PUBLICATIONS

Frump, *Oxazolines, Their Prep., Reactions and Applications*, Chem. Rev., vol. 71, No. 5, pp. 483–505, 1971.

*Primary Examiner*—Veronica O'Keefe
*Attorney, Agent, or Firm*—Howson and Howson

[57] ABSTRACT

A process for quenching metals, particularly steel, using as the quenching bath an aqueous composition containing (a) a substituted oxazoline polymer and (b) an N-vinyl heterocyclic polymer or copolymer in which the heterocyclic group is composed of carbon, nitrogen and hydrogen. The quenching bath provides reduced cooling rates through the martensite temperature ranges.

51 Claims, 8 Drawing Figures

AQUEOUS QUENCHANTS CONTAINING POLYOXAZOLINES AND N-VINYL HETEROCYCLIC POLYMERS AND THEIR USE IN QUENCHING STEEL

DESCRIPTION

This application is a continuation-in-part of application Ser. No. 561,980 filed Dec. 16, 1983, now U.S. Pat. No. 4,486,246 which earlier filed application is a continuation-in-part of application Ser. No. 495,679 filed May 18, 1983, now abandoned.

BACKGROUND OF THE INVENTION

This invention relates to the heat treatment of metals, and more particularly to a novel process for quenching metals.

In order to modify the physical properties of metals and their alloys, various methods of heat treatment have been devised in which the metal is heated to a given elevated temperature and then cooled. Generally the cooling takes place at a relatively rapid rate, and such cooling is commonly referred to as "quenching". Quenching is accomplished by immersing the hot metal in a liquid bath, usually water or oil.

Water alone produces very rapid cooling and is not suitable for quenching many types of steel, for it produces excessive strains which warp and crack the steel. Hydrocarbon oils provide a relatively slow rate of cooling which is desired to produce certain physical properties, such as ductility, in steel. However, the slower cooling rate provided by oil quenching, although it prevents excessive strains in the metal, often prevents development of the desired hardness.

It, therefore, is desirable to provide quench liquids which will cool the metal at rates similar to oil, or intermediate between oil and water, while achieving the greatest degree of hardness without warping or cracking the steel. To this end various aqueous solutions and dispersions of organic compounds have been proposed as quenching fluids. Such aqueous solutions and dispersions approach the quenching properties of oil, but without the disadvantages of the fire, smoke and fumes associated with the use of oil.

For example, U.S. Pat. No. 3,220,893 discloses a liquid quenching medium comprising an aqueous solution of a liquid oxyalkylene polymer having both oxyethylene and higher oxyalkylene groups and a molecular weight of 12,000 to 14,000. Such compounds are also referred to as polyether polyols and poly(oxyethylene-oxyalkylene)glycols. According to the patent, the oxyalkylene polymers have the characteristic of decreasing in solubility as the temperature of the quenching bath is increased, as when red hot metal is introduced therein. The oxyalkylene polymers are said to form a covering over the metal surface to the exclusion of the water component of the bath. The polymer layer is said to be an excellent heat conducting medium which operates at a high rate, and thus use thereof requires relatively short quench cycle time, which results in minimum interval stress and distortion of the metal, while at the same time imparting uniform hardenability of the metal.

Such nonionic oxyalkylene polymer quenchants control cooling rate of the metal not only by such inverse solubility with temperature, but also by increasing the viscosity of the water in which they are dissolved. Accordingly, it has been the practice to use large amounts of polymer, e.g. 10 to 15% by weight. In use, such relatively concentrated baths suffer from the disadvantage of "drag out", i.e. the polymer is removed with the metal being quenched resulting in undesirable changes in bath viscosity and the necessity for treatment of resulting effluent from washing of the quenched metal to remove adhering polymer. Very high molecular weight nonionic polyoxyalkylene glycols can be used, but the increase in viscosity they cause makes them impractical.

It has been suggested to increase the quench cycle time by use of organic compounds which cause the formation of a vapor blanket about the metal during the quenching operation. An example of such an organic compound is a water-soluble polyacrylate, such as sodium polyacrylate, the use of which compound in a quenching bath comprises the subject matter of U.S. Pat. No. 4,087,290.

Quenching of metal using as the quenching medium an aqueous solution of a water-soluble polymer of a $C_2$–$C_4$ olefin having a heterocyclic side group composed of carbon, nitrogen and oxygen is suggested in U.S. Pat. No. 3,902,929.

In copending application Ser. No. 561,980, the specification of which, as well as that of earlier filed application Ser. No. 495,679 is incorporated herein by reference, there is disclosed a quenching process employing a quenching bath comprising an aqueous solution or dispersion of a substituted oxazoline polymer, such as polyethyloxazoline, which is capable of providing quenching effects similar to those produced by oil quenchants, as well as quenching times between those provided by oil and water.

An object of this invention is to provide a novel metal quenching process employing a quenching bath which can be varied in composition to provide a broad range of quenching rates from that of oil toward that of water.

Another object of this invention is the provision of novel quenching baths which provide for slower quenching rates at the temperature where martensite transformation starts resulting in improved physical properties in the quenched metal.

A further object of the present invention is to provide novel quenching baths which provide cooling rates comparable with those based on aqueous solutions or dispersions of substituted polyoxazolines, but using reduced amounts of such compounds and consequently providing reduced costs.

Still another object of this invention is the provision of concentrates which can be diluted with water to form quenching baths of reduced quenching rates.

These and other objects of the invention will become apparent from the following description.

FIGS. I to VIII, which are cooling rate curves at 700° F. (371° C.) for various quenching baths, including those of the present invention, and examples, which examples are included for purposes of illustration and are not intended to limit the scope of the invention as defined by the claims.

DETAILED DESCRIPTION OF THE INVENTION

According to this invention there are provided novel quenching baths and quenching processes using such baths in the heat treatment of metals. More particularly the baths comprise a mixture of (a) a water-soluble or water-dispersible, nonionic, substituted polyoxazoline and (b) a water-soluble or water-dispersible polymer or copolymer of a $C_2$–$C_4$ olefin having a heterocyclic side group composed of carbon, nitrogen and oxygen, sometimes referred to herein as an "N-vinyl heterocyclic" polymer or copolymer.

The water-soluble or water-dispersible, nonionic substituted oxazoline polymers have recurring units of the formula where R is an organic radical which does not significantly decrease the water-solubility or water-dispersibility or nonionic character of the polymer. Usually R will be a substituent selected from the group consisting of a phenyl group or an alkyl group containing from 1 to 7 carbon atoms which may be halogen substituted, although R is not necessarily limited to such groups, and n is an integer such as to provide said polymers with a molecular weight of from about 5000 to about 1,000,000, preferably 50,000 to 500,000. The substituent R in at least about 50 percent of said units in said polymers should be alkyl containing from 1 to 3 carbon atoms. Particularly preferred baths according to the invention contain an alkyloxazoline polymer having a molecular weight of from about 200,000 to about 500,000, and in which the alkyl group R contains from 2 to 3 carbon atoms.

The water-soluble or water-dispersible homopolymers of N-vinyl heterocyclics have the general formula:

where R' is ethylene, propylene or butylene, and x is an interger such as to provide the polymers with a molecular weight of from about 5,000 to about 400,000. Preferably, the molecular weight is in the range of from about 50,000 to 360,000, polymers having a molecular weight in the range of 100,000 to 200,000 being particularly preferred.

Copolymers of N-vinyl heterocyclics may also be used in the quenching baths and process of this invention. Typical of such compounds are the copolymers of N-vinyl pyrrolidone with such co-monomers as styrene, vinyl acetate, methacrylates such as dimethylaminoethylmethacrylate, and maleic anhydride. The last-named copolymers have recurring units of the formula where R" is hydrogen or a metal ion, such as an alkali metal ion, or a salt forming ammonium or amino group, and y is an integer. The molecular weights of such copolymers should be similar to those of the homopolymers.

Preferably constituent (b) is an N-vinyl pyrrolidone polymer having a molecular weight of from about 5000 to about 400,000.

It was discovered that in an aqueous quenching bath containing substituted polyoxazoline constituent (a), a substantial portion of said component could be replaced by the N-vinyl heterocyclic compound (b) without any significant increase in cooling rate. More particularly, it was discovered that at bath concentrations of constituent (a) in the range of from about 0.5 to about 3.0%, by weight, up to three-forths thereof could be replaced by the less expensive, commercially available N-vinyl heterocyclic compound and slow cooling rates could still be retained. The reason why such advantageous result is obtained is not fully understood, but possibly it is due to some thickening effect provided by the N-vinyl heterocyclic compound.

Apparently the quenching baths of this invention, like those based entirely on substituted oxazoline polymers, exhibit a relatively short vapor phase similar to oil quenchants and also an extended convection stage which is more pronounced at higher temperatures. Thus, the quenching baths of this invention find utility where other aqueous baths containing polymers are unsatisfactory.

Of particular importance is the discovery that in the novel quenching baths of this invention, replacement of from about 10% to about 90%, by weight, preferably about 25% to about 75%, of the oxazoline polymer with the N-vinyl heterocyclic polymer or copolymer, provides substantially slower cooling rates in the martensite region in quenching of steel, such rate being slower than that to be expected based on cooling rates for the individual constituents (a) and (b). Such slowing of the cooling rate in this region is most important in order to reduce and even eliminate the possibility of undesirable cracking and distortion of the quenched metal.

The following examples more fully describe the quenching process of this invention, but are not to be construed as in any way limiting the scope of the invention.

Test Procedures

In each test where cooling time was determined, the test specimen was a cylinder 500 millimeters long and 10 millimeters in diameter, and composed of scaleproof austenitic steel. A microthermocouple was inserted into the center of the cylinder, and the temperature-representing output of the thermocouple was recorded by means of a plotter (Bascom-Turner) which simultaneously recorded specimen temperature vs. time and cooling rate vs. specimen temperature. The test specimen was heated in an electric resistance furnace which was operated without a controlled atmosphere and adjusted to a temperature of about 1700° F. (925° C.). In each test, the test specimen at the time of immersion in the quenchant was 1620° F. (849° C.). The quantity of quenchant used was 0.5 liters, and the temperature of the quenchant was 80° F. (27° C.).

Cooling curves were obtained using the above test conditions with aqueous quenching baths of various compositions. Cooling times during which the test specimens were cooled from 1600° F. (871° C.) to 400° F. (204° C.) were determined from the cooling curves. Cooling rate at 700° F. (371° C.) was determined from the cooling rate curves. The results obtained are described hereinbelow.

EXAMPLE I

Eighteen quenching baths were prepared. Six baths comprised aqueous solutions of polyethyloxazoline having a molecular weight of 500,000, the concentrations of the baths being 0.5, 0.75, 1.0, 1.25, 1.75 and 2.0%, by weight. The second series of six baths contained polyvinylpyrrolidone, the concentrations in the respective baths being the same as those for the baths containing polyethyloxazoline. The third series of baths contained a mixture of equal parts by weight of polyethyloxazoline and polyvinylpyrrolidone, the concentrations of the mixtures being the same as for the other twelve baths. Cooling times for the several baths were determined using the procedure hereinabove described. The data obtained as a result of such tests are set forth in Table I, below:

TABLE I

| | Cooling Time (Sec.) | | | | | |
|---|---|---|---|---|---|---|
| Weight % | 0.5 | 0.75 | 1.0 | 1.25 | 1.75 | 2.0 |
| Polymer Type | | | | | | |
| PEO* | 3.5 | 4.6 | 5.1 | 9 | 13.3 | 13.4 |
| PVP** | 3.9 | 3.9 | 4.1 | 4.5 | 5.7 | 6.3 |
| 50% PEO 50% PVP | 4.8 | 5.5 | 7.4 | 8.9 | 12.3 | 13.5 |

*Polyethyloxazoline (MW 500,000)
**Polyvinylpyrrolidone (MW 360,000)

EXAMPLE II

Five quenching baths were prepared in which the total concentration, whether component (a) alone, component (b), alone, or a mixture of components (a) and (b), was 1.5%, by weight. Component (a) was polyethyloxazoline (POE) having a M.W. of 500,000 and component (b) was polyvinylpyrrolidone (PVP) having a M.W. of 360,000. Using these quenching baths, cooling curves were obtained using the above described procedure. The results obtained are set forth in Table II, below:

TABLE II

| Component | % POE | % PVP | Cooling Time Sec. |
|---|---|---|---|
| POE | 100 | 0 | 8.0 |
| PVP | 0 | 100 | 4.2 |
| POE + PVP | 75 | 25 | 10.6 |
| POE + PVP | 50 | 50 | 9.8 |
| POE + PVP | 25 | 75 | 9.4 |

The data is Table II show that the greatest effect in slowing cooling rate was obtained when 25% of the polyethyloxazoline was replaced by the polyvinylpyrrolidone. From Tables I and II it can be seen that polyvinylpyrrolidone nearly always provides faster (lower number of seconds) cooling rates than polyethyloxazoline alone or the combination of POE and PVP.

EXAMPLE III

The purpose of this example was to determine the cooling rate for various quenching baths at that temperature, approximately 700° F. (371° C.) at which some martensite transformation in steel starts ($M_s$). In each experiment, the quenching bath contained a combined total for constituents (a) and (b) of 1% or 2%. Some baths contained only oxazoline polymer (PEO), while others contained only polyvinylprrolidone (PVP). In addition, there were baths containing 75, 50 and 25% of polyoxazoline, and 25, 50 and 75%, respectively, of polyvinylpyrrolidone. The oxazoline polymer used had a molecular weight of either 200,000 or 500,000 whereas, the molecular weight of the polyvinylpyrrolidone was 40,000; 160,000 or 360,000.

The procedure used has been described previously and the results obtained are set forth in FIGS. I to VII, inclusive. In the several figures, the total concentration of PVP and PEO combined, and the molecular weights of the respective polymers were as set forth in Table III, below:

TABLE III

| Figure | Total Concentration | M.W. PVP | M.W. POE |
|---|---|---|---|
| I | 1 | $3.6 \times 10^5$ | $2 \times 10^5$ |
| II | 2 | $3.6 \times 10^5$ | $2 \times 10^5$ |
| III | 1 | $1.6 \times 10^5$ | $5 \times 10^5$ |
| IV | 2 | $1.6 \times 10^5$ | $5 \times 10^5$ |
| V | 1 | $1.6 \times 10^5$ | $2 \times 10^5$ |
| VI | 2 | $1.6 \times 10^5$ | $2 \times 10^5$ |
| VII | 2 | $4 \times 10^4$ | $5 \times 10^5$ |

EXAMPLE IV

Figure 1:
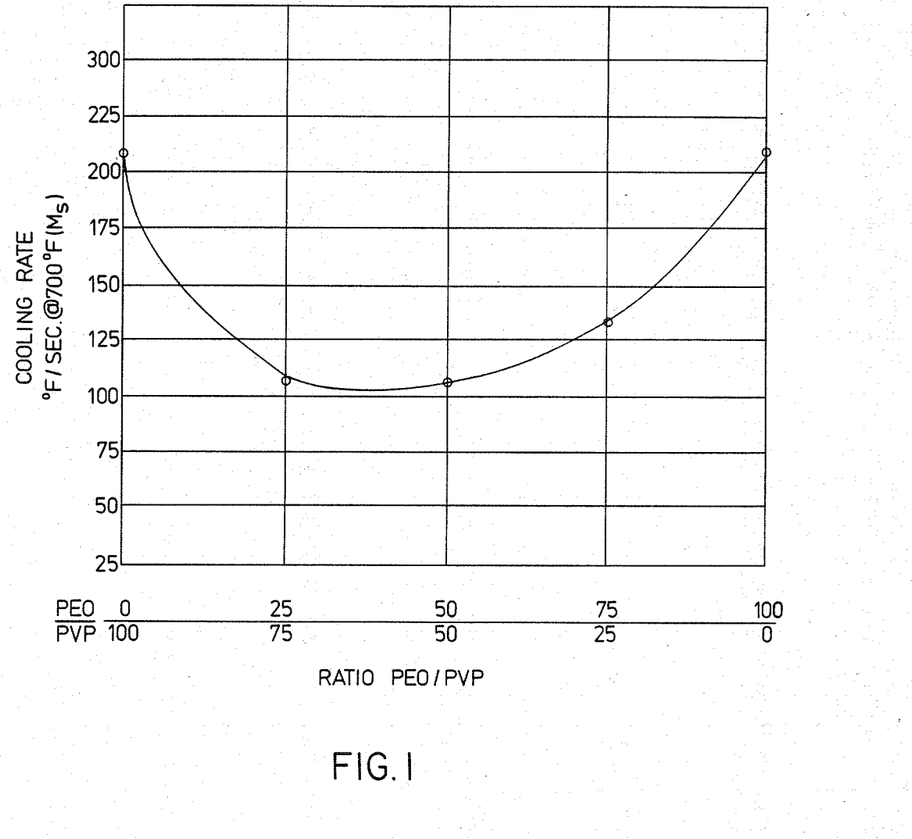
Figure 2:
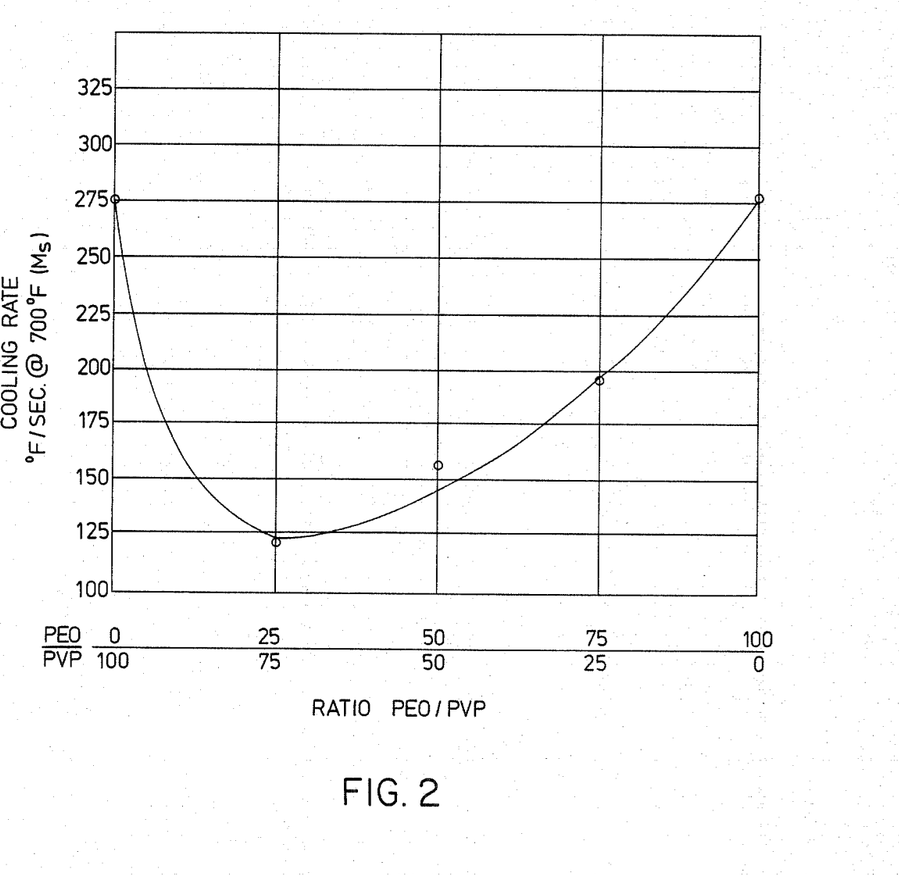
Figure 3:
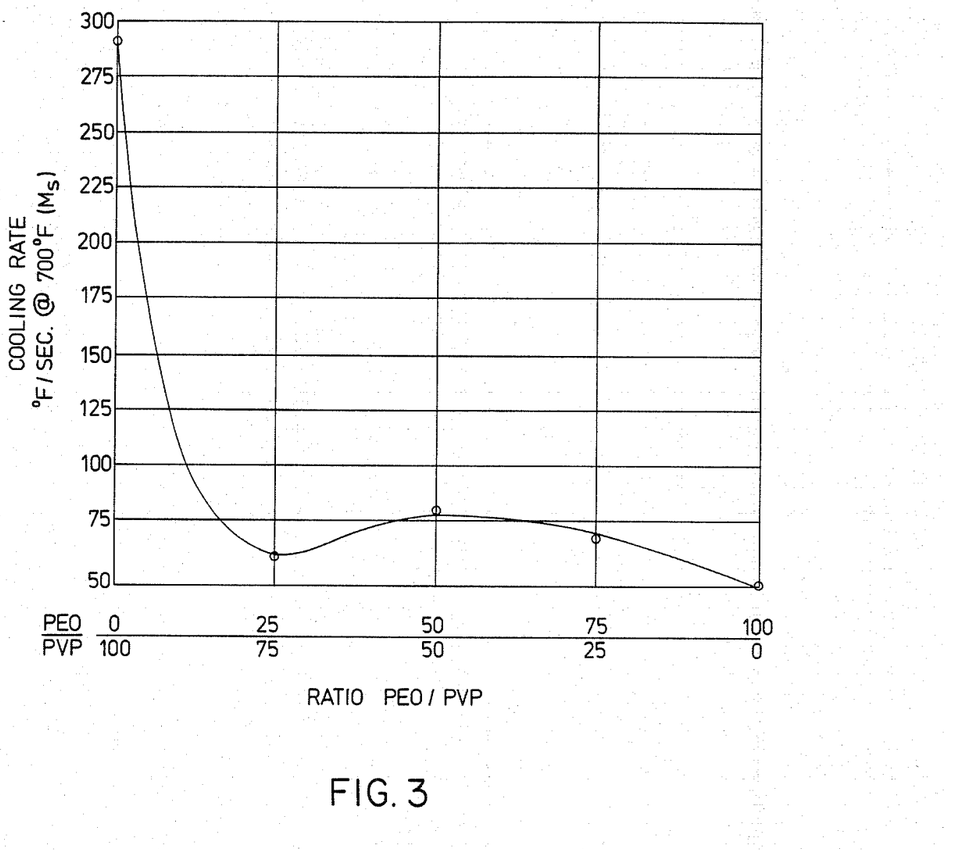
Figure 4:
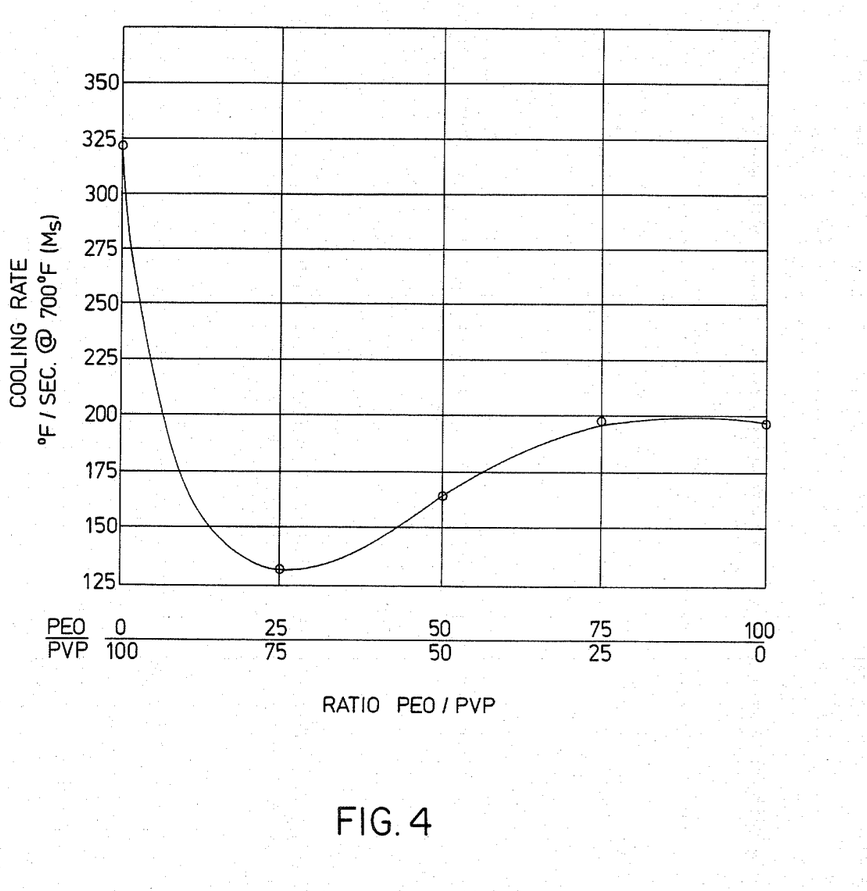
Figure 5:
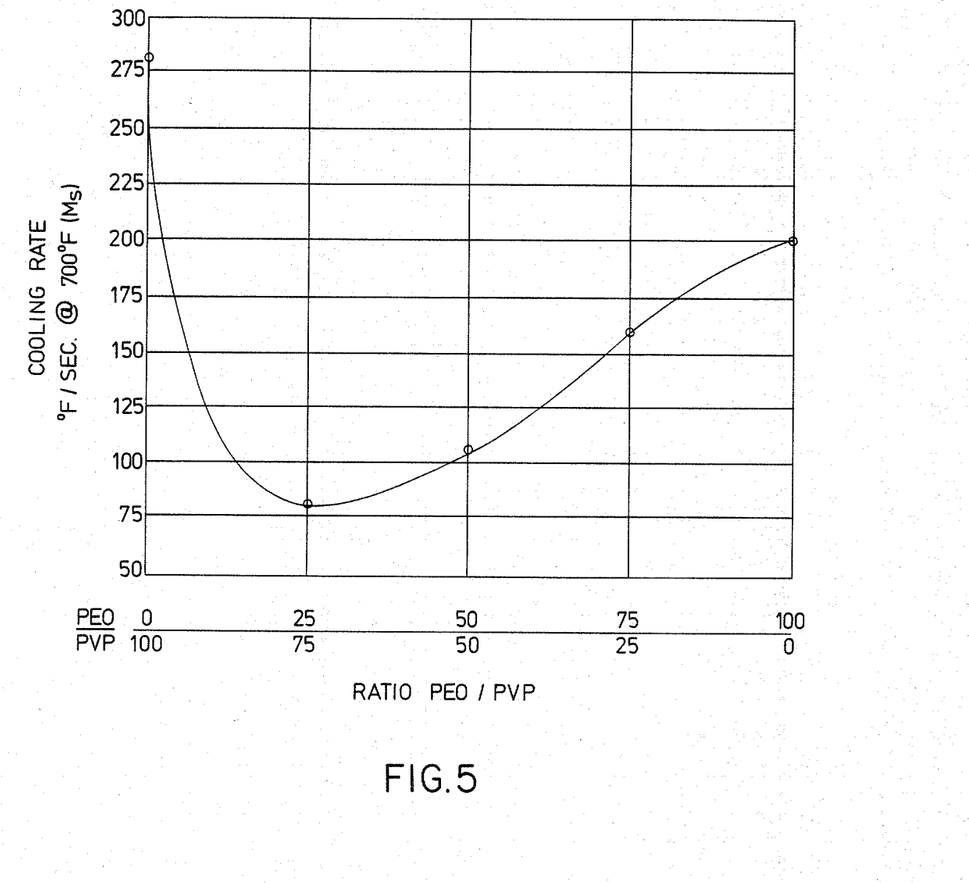
Figure 6:
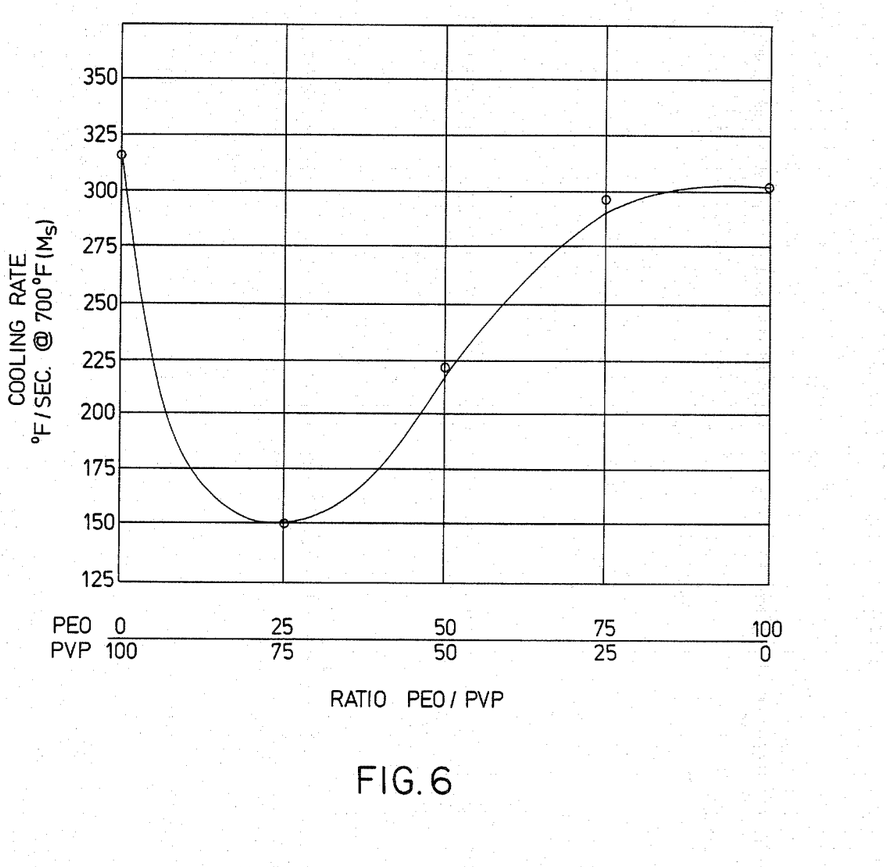
Figure 7:
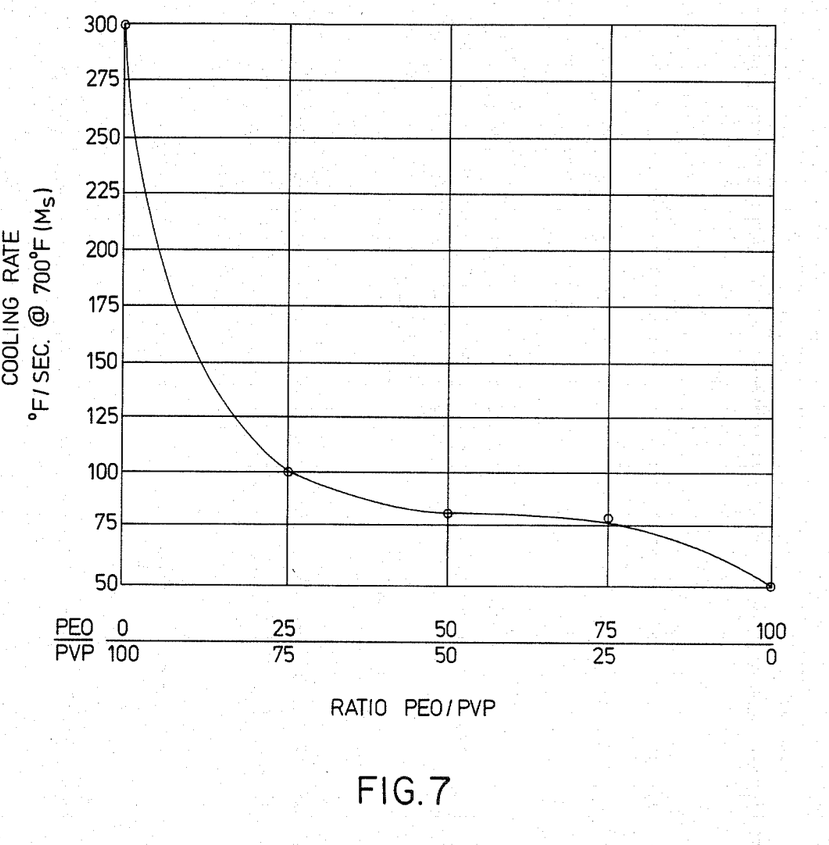
Figure 8:
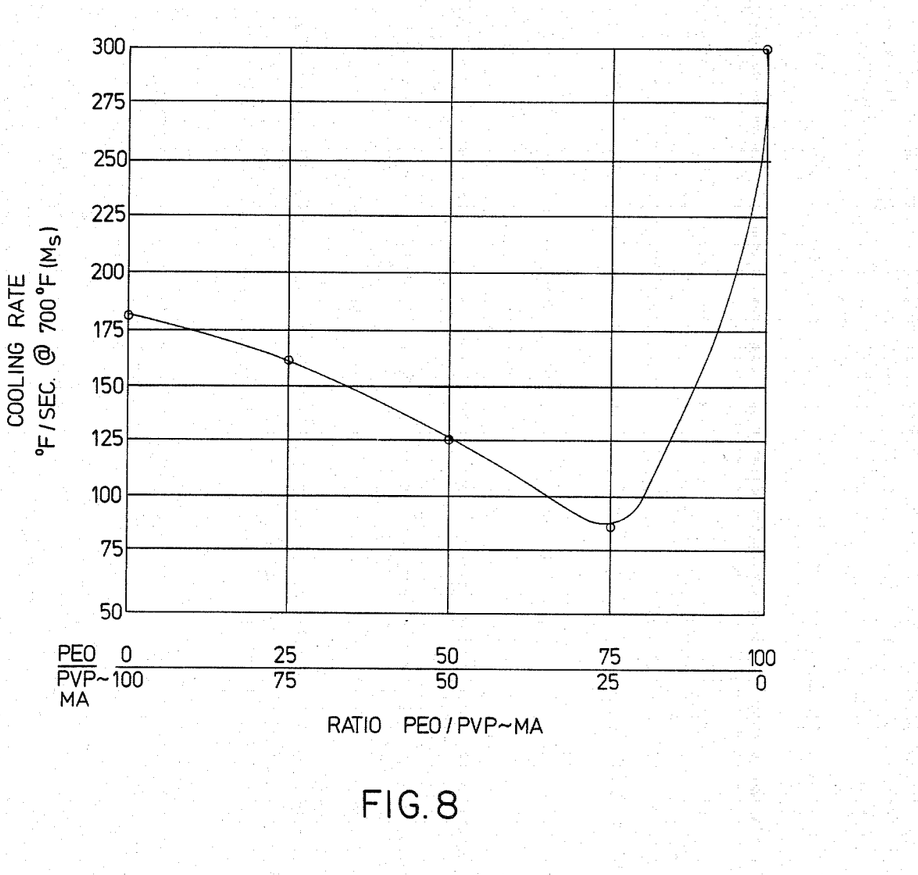

The procedure of Example III was repeated using 5 baths containing a total of 2% of either a mixture of polyethyloxazoline having a molecular weight of 200,000 and a copolymer of N-vinyl pyrrolidone and maleic anhydride (PVP-MA) having a molecular weight of 14,000 or the individual components above. Cooling rate (°F./sec.) at 700° F. (371° C.) was determined for each bath and the results obtained are set forth in Table IV, below, and are plotted in FIG. 8.

TABLE IV

| Component | % PEO | % PVP-MA | Cooling Time (sec.) |
|---|---|---|---|
| PEO | 100 | 0 | 178 |
| PVP-MA | 0 | 100 | 307 |
| PEO + PVP-MA | 75 | 25 | 164 |
| PEO + PVP-MA | 50 | 50 | 125 |
| PEO + PVP-MA | 25 | 75 | 87 |

As noted previously tranformation at the martensite region is aided if the cooling rate is low in this region, for slow cooling reduces and even eliminates the possibility of cracking and distortion. The data in FIGS. I to VIII show that using various quenching baths according to this invention containing both a substituted polyoxazoline and a polymer or copolymer of N-vinylpyrrolidone, slower cooling rates than those obtained by either POE or PVP alone, are obtained. The effect changes with the ratio of POE to PVP, concentration and molecular weight of the respective polymers used. Such synergistic effect was not predictable based in the cooling rates provided by the individual components (a) and (b). Thus, as stated previously, an economic advantage is to be obtained using the novel quenching baths of the present invention for a portion of the more expensive POE can be replaced by PVP, yet slower cooling rates than those provided by POE alone are obtained.

As indicated previously, this invention also contemplates concentrates from which the novel quenching baths of this invention can be prepared merely by addition of water. Such concentrates are aqueous compositions containing at least a combined total of 5%, by weight, of components (a) and (b), and may contain a total of such components up to the solubility limit thereof which may be as high as 60% to 70%. Ordinar-

I claim:

1. In the process of quenching which is useful in the heat treatment of metals wherein a metal is heated to an elevated temperature and said heated metal is then quenched in a bath comprising a liquid quenching medium to effect desirable metallurgical changes in the metal, the improvement which comprises using as said quenching medium an aqueous composition comprising an effective cooling rate reducing amount of a mixture of (a) a nonionic, water-soluble or water-dispersible substituted oxazoline polymer having recurring units of the general formula where R is an organic radical which does not significantly alter the nonionic and water-soluble and water-dispersible characteristics of said oxazoline polymer when said polymer is present in said concentrations, and n is an integer such as to provide said oxazoline polymer with a molecular weight of from about 5000 to 1,000,000 and (b) a water-soluble or water-dispersible N-vinyl heterocyclic polymer or copolymer in which the heterocyclic group is composed of carbon, nitrogen and oxygen, said N-vinyl polymer or copolymer having a molecular weight of from about 5000 to about 400,000.

2. A process according to claim 1 in which the total concentration of said mixture of polymers in said quenching medium is from about 0.5% to 3%, by weight, based on the total weight of the quenching medium, said oxazoline polymer has a molecular weight of from about 50,000 to about 500,000, and said N-vinyl polymer or copolymer has a molecular weight of from about 50,000 to 360,000.

3. A process according to claim 2 in which the total concentration of said mixture of polymers in said quenching medium is from about 0.5% to about 1.5%, said oxazoline polymer has a molecular weight in the range of from about 200,000 to about 500,000, and said N-vinyl polymer or copolymer has a molecular weight of from about 100,000 to 200,000.

4. The process according to claim 3 in which the weight ratio component (a) to component (b) in said bath is in the range of from about 90% of component (a) to about 10% of component (b) to about 10% of component (a) to about 90% of component (b).

5. The process according to claim 4 in which the weight ratio of component (a) to component (b) in said bath is in the range of from about 75% of component (a) to 25% of component (b) to 25% of component (a) to 75% of component (b).

6. The process according to claim 5 in which the weight ratio of component (a) to component (b) in said quenching bath is about 75% component (a) and 25% component (b).

7. In the process of quenching which is useful in the heat treatment of metals wherein a metal is heated to an elevated temperature and said heated metal is then quenched in a bath comprising a liquid quenching medium to effect desirable metallurgical changes in the metal, the improvement which comprises using as said quenching medium a composition comprising an effective cooling rate reducing amount of a mixture of (a), a nonionic, water-soluble or water-dispersible substituted oxazoline polymer having recurring units of the formula where R is a substituent selected from the group consisting of a phenyl group or an alkyl group containing from 1 to 7 carbon atoms which may be halogen substituted, and n is an integer such as to provide said polymer with a molecular weight of from about 5000 to about 1,000,000, the substituent R in at least about 50 percent of said units in said polymer being alkyl containing from 1 to 3 carbon atoms, and (b) a water-soluble or water-dispersible N-vinyl heterocyclic polymer or copolymer selected from the group consisting of polyvinylpyrrolidone, and copolymers of N-vinyl pyrrolidone with styrene, vinyl acetate, maleic anhydride, or a methacylate, said N-vinyl heterocyclic compound having a molecular weight of from about 5000 to 400,000.

8. A process according to claim 7 in which the total concentration of said mixture of polymers in said quenching medium is from about 0.5% to 3%, by weight, based on the total weight of the quenching medium, said oxazoline polymer has a molecular weight of from about 50,000 to about 500,000, and said N-vinyl polymer or copolymer has a molecular weight of from about 50,000 to 360,000.

9. A process according to claim 8 in which the total concentration of said mixture of polymers in said quenching medium is from about 0.5% to about 1.5%, said oxazoline polymer has a molecular weight in the range of from about 200,000 to about 500,000, and said N-vinyl polymer or copolymer has a molecular weight of from about 100,000 to 200,000.

10. The process according to claim 9 in which the weight ratio component (a) to component (b) in said bath is in the range of from about 90% of component (a) to about 10% of component (b) to about 10% of component (a) to about 90% of component (b).

11. The process according to claim 10 in which the weight ratio of component (a) to component (b) in said bath is in the range of from about 75% of component (a) to 25% of component (b) to 25% of component (a) to 75% of component (b).

12. The process according to claim 11 in which the weight ratio of component (a) to component (b) in said quenching bath is about 75% component (a) and 25% component (b).

13. In a process of quenching which is useful in the heat treatment of metals wherein a metal is heated to an elevated temperature and said heated metal is then quenched in a bath comprising a liquid quenching medium to effect desirable metallurgical changes in the metal, the improvement which comprises using as said quenching medium an aqueous solution containing from about 0.5% to 3%, by weight, based on the total weight of the quenching medium, of a mixture of (a) a nonionic, water-soluble or water-dispersible substituted oxazoline polymer having recurring units of the general formula where n is an integer such as to provide said polymer with a molecular weight of from about 50,000 to 500,000, and (b) a water-soluble or water-dispersible polyvinylpyrrolidone having a molecular weight of from about 50,000 to 360,000.

14. The process according to claim 13 in which the total concentration of the polymer mixture in said quenching medium is from about 0.5% to about 1.5%, said polyoxazoline has a molecular weight of from about 200,000 to 500,000, and said polyvinylpyrrolidone has a molecular weight of from about 100,000 to 200,000.

15. The process according to claim 14 in which the weight ratio component (a) to component (b) in said bath is in the range of from about 90% of component (a) to about 10% of component (b) to about 10% of component (a) to about 90% of component (b).

16. The process according to claim 15 in which the weight ratio of component (a) to component (b) in said bath is in the range of from about 75% of component (a) to 25% of component (b) to 25% of component (a) to 75% of component (b).

17. The process according to claim 16 in which the weight ratio of component (a) to component (b) in said quenching bath is about 75% component (a) and 25% component (b).

18. A quenching medium which is useful in the heat treatment of metals comprising aqueous composition containing an effective cooling rate reducing amount of a mixture of (a) a nonionic, water-soluble or water-dispersible substituted oxazoline polymer having recurring units of the general formula where R is an organic radical which does not significantly alter the nonionic and water-soluble and water-dispersible characteristics of said oxazoline polymer when said polymer is present in said concentrations, and n is an integer such as to provide said oxazoline polymer with a molecular weight of from about 5000 to 1,000,000 and (b) a water-soluble or water-dispersible N-vinyl heterocyclic polymer or copolymer in which the heterocyclic group is composed of carbon, nitrogen and oxygen, said N-vinyl polymer or copolymer having a molecular weight of from about 5000 to about 400,000.

19. A quenching medium according to claim 18 in which the total concentration of said mixture of polymers in said quenching medium is from about 0.5% to 3%, by weight, based on the total weight of the quenching medium, said oxazoline polymer has a molecular weight of from about 50,000 to about 500,000, and said N-vinyl polymer or copolymer has a molecular weight of from about 50,000 to 360,000.

20. A quenching medium according to claim 19 in which the total concentration of said mixture of polymers in said quenching medium is from about 0.5% to about 1.5%, said oxazoline polymer has a molecular weight in the range of from about 200,000 to about 500,000, and said N-vinyl polymer or copolymer has a molecular weight of from about 100,000 to 200,000.

21. The quenching medium according to claim 20 in which the weight ratio component (a) to component (b) in said bath is in the range of from about 90% of component (a) to about 10% of component (b) to about 10% of component (a) to about 90% of component (b).

22. A quenching medium according to claim 21 in which the weight ratio of component (a) to component (b) in said medium is in the range of from about 75% of component (a) to 25% of component (b) to 25% of component (a) to 75% of component (b).

23. A quenching medium according to claim 22 in which the weight ratio of component (a) to component (b) in said quenching medium is about 75% component (a) and 25% component (b).

24. A quenching medium which is useful in the heat treatment of metals comprising an aqueous composition containing an effective cooling rate reducing amount of a mixture of (a), a nonionic, water-soluble or water-dispersible substituted oxazoline polymer having recurring units of the formula where R is a substituent selected from the group consisting of a phenyl group or an alkyl group containing from 1 to 7 carbon atoms which may be halogen substituted, and n is an integer such as to provide said polymer with a molecular weight of from about 5000 to about 1,000,000, the substituent R in at least about 50 percent of said units in said polymer being alkyl containing from 1 to 3 carbon atoms, and (b) a water-soluble or water-dispersible N-vinyl heterocyclic polymer or copolymer selected from the group consisting of polyvinylpyrrolidone, and copolymers of N-vinyl pyrrolidone with styrene, vinyl acetate, meleic anhydride, or a methacrylate, said N-vinyl heterocyclic compound having a molecular weight of from about 5000 to 400,000.

25. A quenching medium according to claim 24 in which the total concentration of said mixture of polymers in said quenching medium is from about 0.5% to 3%, by weight, based on the total weight of the quenching medium, said oxazoline polymer has a molecular weight of from about 50,000 to about 500,000, and said N-vinyl polymer or copolymer has a molecular weight of from about 50,000 to 360,000.

26. A quenching medium according to claim 25 in which the total concentration of said mixture of polymers in said quenching medium is from about 0.5% to about 1.5%, said oxazoline polymer has a molecular weight in the range of from about 200,000 to about 500,000, and said N-vinyl polymer or copolymer has a molecular weight of from about 100,000 to 200,000.

27. The quenching medium according to claim 26 in which the weight ratio of component (a) to component (b) in said medium is in the range of from about 90% of component (a) to about 10% of component (b) to about 10% of component (a) to about 90% of component (b).

28. A quenching medium according to claim 27 in which the weight ratio of component (a) to component (b) in said medium is in the range of from about 75% of component (a) to 25% of component (b) to 25% of component (a) to 75% of component (b).

29. A quenching medium according to claim 28 in which the weight ratio of component (a) to component (b) in said quenching medium is about 75% component (a) and 25% component (b).

30. A quenching medium which is useful in the heat treatment of metals comprising an aqueous composition containing from about 0.5% to 3%, by weight, based on the total weight of the quenching medium, of a mixture of (a) a nonionic, water-soluble or water-dispersible substituted oxazoline polymer having recurring units of the general formula where n is an integer such as to provide said polymer with a molecular weight of from about 50,000 to 500,000, and (b) a water-soluble or water-dispersible polyvinylpyrrolidone having a molecular weight of from about 50,000 to 360,000.

31. A quenching medium according to claim 30 in which the total concentration of the polymer mixture in said quenching medium is from about 0.5% to about 1.5%, said polyoxazoline has a molecular weight of from about 200,000 to 500,000, and said polyvinylpyrrolidone has a molecular weight of from about 100,000 to 200,000.

32. The quenching medium according to claim 31 in which the weight ratio component (a) to component (b) in said bath is in the range of from about 90% of component (a) to about 10% of component (b) to about 10% of component (a) to about 90% of component (b).

33. A quenching medium according to claim 31 in which the weight ratio of component (a) to component (b) in said medium is in the range of from about 75% of component (a) to 25% of component (b) to 25% of component (a) to 75% of component (b).

34. A quenching medium according to claim 33 in which the weight ratio of component (a) to component (b) in said quenching medium is about 75% component (a) and 25% component (b).

35. A concentrate for forming a quenching medium which is useful in the heat treatment of metals comprising an aqueous composition containing at least about 5%, by weight, of a mixture of (a) a nonionic, water-soluble or water-dispersible substituted oxazoline polymer having recurring units of the general formula where R is an organic radical which does not significantly alter the nonionic and water-soluble and water-dispersible characteristics of said oxazoline polymer when said polymer is present in said concentrations, and n is an integer such as to provide said oxazoline polymer with a molecular weight of from about 5000 to 1,000,000 and (b) a water-soluble or water-dispersible N-vinyl heterocyclic polymer or copolymer in which the heterocyclic group is composed of carbon, nitrogen and oxygen, said N-vinyl polymer or copolymer having a molecular weight of from about 5000 to about 400,000.

36. A concentrate according to claim 35 in which the total concentration of said mixture of polymers in said concentrate is from about 5% to 70%, by weight, based on the total weight of the concentrate, said oxazoline polymer has a molecular weight of from about 50,000 to about 500,000, and said N-vinyl polymer or copolymer has a molecular weight of from about 50,000 to 360,000.

37. A concentrate according to claim 36 in which the total concentration of said mixture of polymers in said concentrate is from about 5% to about 10%, said oxazoline polymer has a molecular weight in the range of from about 200,000 to about 500,000, and said N-vinyl polymer or copolymer has a molecular weight of from about 100,000 to 200,000.

38. The concentrate to claim 37 in which the weight ratio of component (a) to component (b) in said concentrate is in the range of from about 90% of component (a) to about 10% of component (b) to about 10% of component (a) to about 90% of component (b).

39. A concentrate according to claim 38 in which the weight ratio of component (a) to component (b) in said concentrate is in the range of from about 75% of component (a) to 25% of component (b) to 25% of component (a) to 75% of component (b).

40. A concentrate according to claim 39 in which the weight ratio of component (a) to component (b) in said concentrate is about 75% component (a) and 25% component (b).

41. A concentrate for forming a quenching medium which is useful in the heat treatment of metals comprising an aqueous composition containing at least about 5%, by weight, of a mixture of (a), a nonionic, water-soluble or water-dispersible substituted oxazoline polymer having requiring units of the formula where R is a substituent selected from the group consisting of a phenyl group or an alkyl group containing from 1 to 7 carbon atoms which may be halogen substituted, and n is an integer such as to provide said polymer with a molecular weight of from about 5000 to about 1,000,000, the substituent R in at least about 50 percent of said units in said polymer being alkyl containing from 1 to 3 carbon atoms, and (b) a water-soluble or water-dispersible N-vinyl heterocyclic polymer or copolymer selected from the group consisting of polyvinylpyrrolidone, and copolymers of N-vinyl pyrrolidone with styrene, vinyl acetate, maleic anhydride, or a methacylate, said N-vinyl heterocyclic compound having a molecular weight of from about 5000 to 400,000.

42. A concentrate according to claim 41 in which the total concentration of said mixture of polymers in said concentrate is from about 5% to about 70%, by weight, based on the total weight of the concentrate, said oxazoline polymer has a molecular weight of from about 50,000 to about 500,000, and said N-vinyl polymer or copolymer has a molecular weight of from about 50,000 to 360,000.

43. A concentrate according to claim 42 in which the total concentration of said mixture of polymers in said concentrate is from about 5% to about 10%, said oxazoline polymer has a molecular weight in the range of from about 200,000 to about 500,000, and said N-vinyl polymer or copolymer has a molecular weight of from about 100,000 to 200,000.

44. The concentrate according to claim 43 in which the weight ratio of component (a) to component (b) in said concentrate is in the range of from about 90% of component (a) to about 10% of component (b) to about 10% of component (a) to about 90% of component (b).

45. A concentrate according to claim 44 in which the weight ratio of component (a) to component (b) in said concentrate is in the range of from about 75% of component (a) to 25% of component (b) to 25% of component (a) to 75% of component (b).

46. A concentrate according to claim 45 in which the weight ratio of component (a) to component (b) in said concentrate is about 75% component (a) and 25% component (b).

47. A concentrate for forming a quenching medium which is useful in the heat treatment of metals comprising an aqueous composition containing at least about 5%, by weight, based on the total weight of the concentrate, of a mixture of (a) a nonionic, water-soluble or water-dispersible substituted oxazoline polymer having recurring units of the general formula where n is an integer such as to provide said polymer with a molecular weight of from about 50,000 to 500,000, and (b) a water-soluble or water-dispersible polyvinylpyrrolidone having a molecular weight of from about 50,000 to 360,000.

48. A concentrate according to claim 47 in which the total concentration of the polymer mixture in said concentrate is from about 5% to about 10%, said polyoxazoline has a molecular weight of from about 200,000 to 500,000, and said polyvinylpyrrolidone has a molecular weight of from about 100,000 to 200,000.

49. The concentrate according to claim 48 in which the weight ratio of component (a) to component (b) in said concentrate is in the range of from about 90% of component (a) to about 10% of component (b) to about 10% of component (a) to about 90% of component (b).

50. A concentrate according to claim 49 in which the weight ratio of component (a) to component (b) in said concentrate is in the range of from about 75% of component (a) to 25% of component (b) to 25% of component (a) to 75% of component (b).

51. A concentrate according to claim 50 in which the weight ratio of component (a) to component (b) in said concentrate is about 75% component (a) and 25% component (b).

* * * * *

UNITED STATES PATENT AND TRADEMARK OFFICE
CERTIFICATE OF CORRECTION

PATENT NO. : 4,528,044
DATED : July 9, 1985
INVENTOR(S) : Joseph F. Warchol

It is certified that error appears in the above-identified patent and that said Letters Patent are hereby corrected as shown below:

Column 3, lines 59 to 65 should read

Column 5, line 37 "(POE)" should read --(PEO)--
line 57 POE" should read -PEO--
lines 43 to 49 should read Table II

| Component | % PEO | % PVP | Cooling Time Sec. |
|---|---|---|---|
| PEO | 100 | 0 | 8.0 |
| PVP | 0 | 100 | 4.2 |
| PEO + PVP | 75 | 25 | 10.6 |
| PEO + PVP | 50 | 50 | 9.8 |
| PEO + PVP | 25 | 75 | 9.4 |

Column 6, lines 14, 51, 52, 59 and 60 "POE" should read --PEO--

Signed and Sealed this

Twelfth Day of November 1985

[SEAL]

Attest:

DONALD J. QUIGG

Attesting Officer

Commissioner of Patents and Trademarks